United States Patent [19]
Suzuki

[11] Patent Number: 6,006,314
[45] Date of Patent: *Dec. 21, 1999

[54] IMAGE PROCESSING SYSTEM, STORAGE DEVICE THEREFOR AND ACCESSING METHOD THEREOF

[75] Inventor: Hitoshi Suzuki, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/587,655

[22] Filed: Jan. 17, 1996

[30] Foreign Application Priority Data

Jan. 18, 1995 [JP] Japan ................... 7-005827

[51] Int. Cl.⁶ .................................................. G06F 9/32
[52] U.S. Cl. ................... 711/217; 711/220; 711/221; 711/118; 711/119
[58] Field of Search ................. 395/412–19, 421.07, 395/421.1, 421.11, 457, 469; 358/223; 711/5, 202, 221, 220, 170, 203, 208; 235/492; 341/67

[56] References Cited

U.S. PATENT DOCUMENTS

| | | | |
|---|---|---|---|
| 3,815,101 | 6/1974 | Boss ........................................ | 711/220 |
| 4,319,322 | 3/1982 | Allain et al. ............................. | 711/206 |
| 4,385,352 | 5/1983 | Bienvenu ................................. | 711/208 |
| 4,523,206 | 6/1985 | Sasscer ................................... | 711/130 |
| 4,811,203 | 3/1989 | Hamstra .................................. | 711/113 |
| 4,868,376 | 9/1989 | Lessin ..................................... | 235/492 |
| 5,282,275 | 1/1994 | Andre et al. ............................ | 711/220 |
| 5,309,258 | 5/1994 | Kouno et al. ........................... | 358/523 |
| 5,465,337 | 11/1995 | Kong ...................................... | 711/207 |
| 5,572,209 | 11/1996 | Farmer et al. ........................... | 341/67 |
| 5,577,219 | 11/1996 | Timko et al. ........................... | 711/201 |
| 5,584,005 | 12/1996 | Miyaoku et al. ....................... | 711/206 |
| 5,611,065 | 3/1997 | Alferness ................................ | 711/220 |
| 5,623,640 | 4/1997 | Nakabo .................................. | 711/170 |
| 5,655,132 | 8/1997 | Watson ................................... | 395/674 |

*Primary Examiner*—Eddie P. Chan
*Assistant Examiner*—Than V. Nguyen
*Attorney, Agent, or Firm*—McGinn & Gibb, P.C.

[57] ABSTRACT

A storage device has a relative address table. An address is sequentially generated by an address adder based on a start address and a plurality of relative addresses held in the relative address table. When a pattern of the address is unchanged, a succeeding access is processed without resetting the relative addresses in the relative address table.

20 Claims, 2 Drawing Sheets

IMAGE PROCESSING SYSTEM, STORAGE DEVICE THEREFOR AND ACCESSING METHOD THEREOF

BACKGROUND OF THE INVENTION

The present invention relates to a system and storage device for image processing, and an accessing method of the storage device, and more particularly to a system and storage device for generating an address of a specified area on a display unit and for accessing that address.

A conventional pattern image generation device for an image processing system uses a special counter to be set into a count mode that corresponds to the address patterns to be generated. For example, the device has modes of incrementing an address at every clock (e.g., video clock), incrementing an address in a block, and making a repetitive address identical in a plurality of signal lines. The device provides a function which is fixed in hardware.

In the conventional scheme, an access to a local data region (e.g., block) of, for example, 3×3 pixels, is processed by an exclusive hardware arrangement and an order pattern of input data is fixed. Moreover, the number of pixels to be processed is limited. Hence, when using a pattern other than a pattern which has been prepared in the hardware, high-speed processing becomes difficult. Since the frequency of an access to a memory in which image data has been stored is generally high, transferring all addresses at every access to the memory unnecessarily increases bus traffic to the memory. Thus, system efficiency and processing speed are degraded.

SUMMARY OF THE INVENTION

In view of the foregoing problems of the conventional device, an object of the invention is to generate addresses flexibly.

In a storage device including a memory according to one aspect of the invention, a plurality of relative addresses for the memory are prepared in a table, and absolute addresses corresponding to the plurality of relative addresses for the memory are generated based on the table.

With the unique and unobvious structure of the present invention, when a pattern of the address is unchanged, a succeeding access is processed without resetting the relative addresses in the relative address table. Thus, system efficiency and processing speed are maintained at a high level.

BRIEF DESCRIPTION OF THE DRAWINGS

The above-mentioned objects, features and advantages of this invention will become more apparent by reference to the following detailed description of the invention taken in conjunction with the accompanying drawings in which.

DETAILED DESCRIPTION OF THE PREFERRED EMBODIMENTS

An image processing system in accordance with an embodiment of the present invention will be described in detail with reference to the accompanying drawings.

Figure 1:
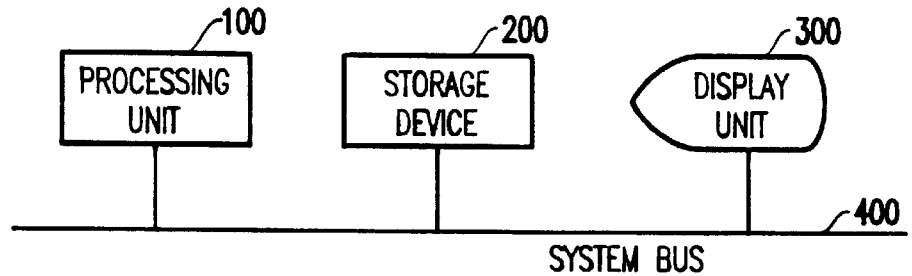
FIG. 1 is a block diagram showing the entire structure of an image processing system in accordance with a first embodiment of the present invention.

Referring to FIG. 1, an image processing system in accordance with a first embodiment of the present invention includes a processing unit 100 that processes image data; a storage device 200 that stores the image data; a display unit 300 that displays an image based on the image data; and a system bus 400 that connects the processing unit 100, storage unit 200 and display unit 300.

The processing unit 100 processes the image data stored in the storage unit 200. For example, the processing unit 100 reads out the image data from the storage unit 200 and processes a logical arithmetic operation such as filtering, convolution processing or the like. Then, the processing unit 100 writes the arithmetic operation result into the storage device 200. Although the processing unit 100, the storage device 200, and the display unit 300 are connected together through the system bus 400 in this example, the processing unit 100 and the storage unit 200 may be connected together with a dedicated signal line or other like hardware device, and the storage unit 200 and the display unit 300 may be connected together with a second dedicated signal line or other hardware device.

Figure 2:
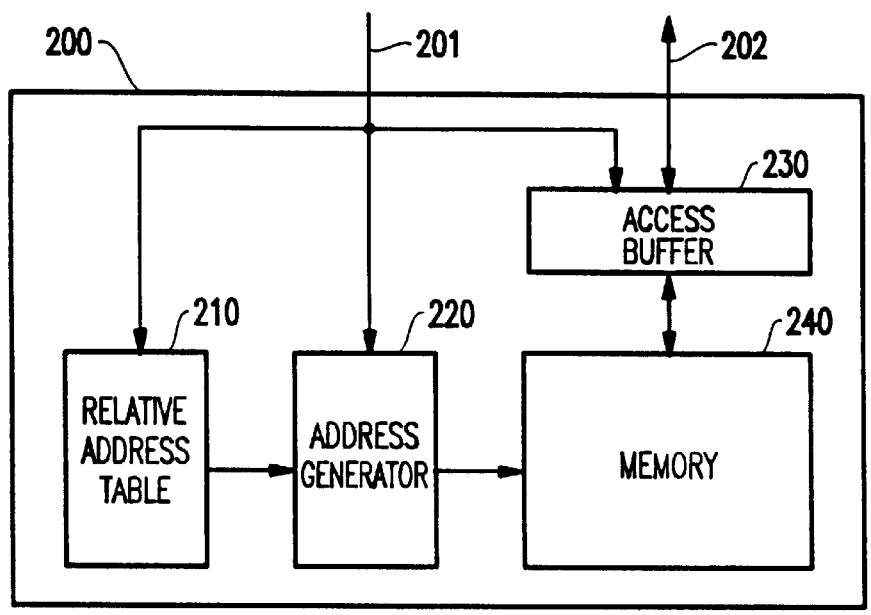
FIG. 2 is a block diagram showing the structure of a storage device 200 in accordance with the first embodiment of the present invention.

Referring to FIG. 2, the storage device 200 includes a relative address table 210, an address generator 220, an access buffer 230 and a memory 240. The relative address table 210 is connected to the system bus 400 through an address command line 201 and a data line 202. The relative address table 210 stores a plurality of relative addresses for the memory 240. The address generator 220 generates absolute addresses with respect to the plurality of relative addresses in the relative address table 210. The memory 240 stores image data. The access buffer 230 holds data or requests necessary for accessing the memory 240. The buffer 230 may be a first-in first-out (FIFO) memory, but, of course, other storage schemes also may be used depending on the designer's requirements.

The address command line 201 transfers a request, such as a memory read request or memory write request, from the processing unit 100. The address command line 201 also transfers the start address and relative addresses to the start address with respect to each element of data to be accessed (hereinafter referred to as "an image data block"). The data line 202 is used for transferring write data to the memory 240 from the processing unit 100 or read data from the memory 240.

The relative address table 210 sequentially stores relative addresses (e.g., relative to the start address) with respect to each element of the image data block which is transferred through the address command line 201.

The address generator 220 generates absolute addresses (e.g., by adding the start address given by the address command line 201 and each of the relative addresses from the relative address table 210 in accordance with a request given by the address command line 201).

The access buffer 230 holds the write data input from the data line 202 in accordance with the request on the address command line 201 or holds the read data read out from the memory 240.

The memory 240 stores the image data and processes the read operation or write operation in accordance with the request given by the address command line 201.

Figure 3:
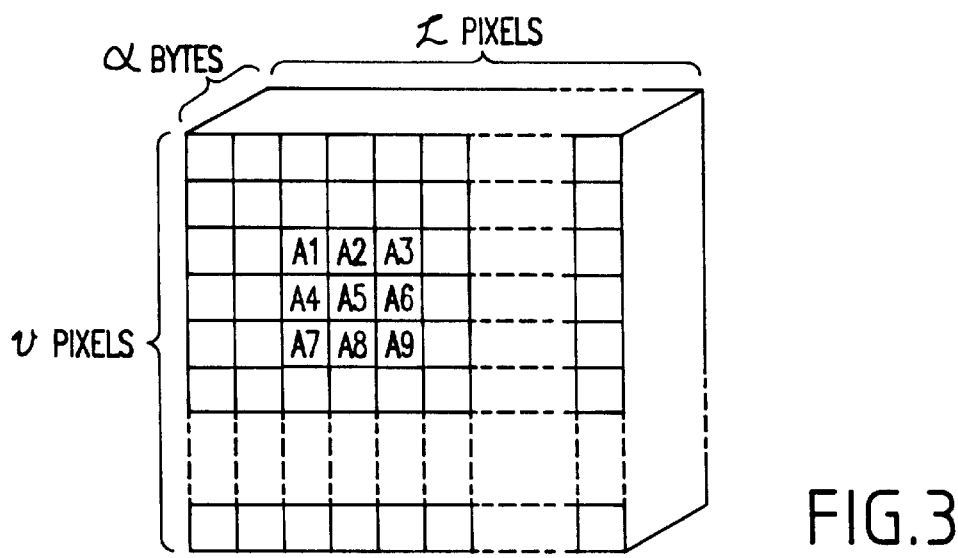
FIG. 3 is a diagram showing the structure of image data in accordance with the first embodiment of the present invention.

Referring to FIG. 3, in one example of the image data stored in the memory 240, the image data has "h" pixels in a horizontal direction and "v" pixels in a vertical direction so as to have a two-dimensional grid, with data for one pixel having "d" bytes. Here, it is assumed that an access is obtained to a region (e.g., block) having 3×3 pixels of A1 to A9 when image processing such as filtering, convolution processing or the like is to be performed. If an address is given by "d" bytes as one word in this case, an address adding "1" to A1 corresponds to A2, and an address adding "2" to A1 corresponds to A3, respectively.

Similarly, A4 is a value resulting from adding the number of pixels for one line in a horizontal direction to A1, (e.g., the value resulting from adding the number of "h" pixels in the one line to A1). Hence, an address adding "h+1" to A1 corresponds to A5, and an address adding "h+2" to A1 corresponds to A6, respectively. Similarly, A7 is a value obtained by adding the number of pixels for two horizontal lines to A1, (e.g., the value adding "2h" to A1). Therefore, an address adding "2h+1" to A1 corresponds to A8, and an address adding "2h+2" to A1 corresponds to A9, respectively.

Figure 4:
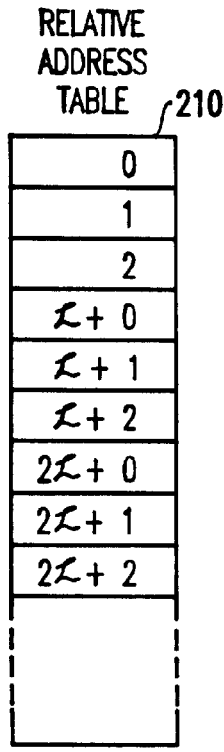
FIG. 4 is a diagram showing the structure of an relative address table 210 in accordance with the first embodiment of the present invention.

Referring to FIG. 4, there is shown a relative address table 210 in the relative addresses of the respective elements are stored with respect to the above-mentioned data region of 3×3 pixels. Hence, the relative address corresponding to A1 is stored in a first element and the address interval corresponding to A2 is stored in a second element, and so forth. Those relative addresses are written in or read out by the request on the address command line 201.

Figure 5:
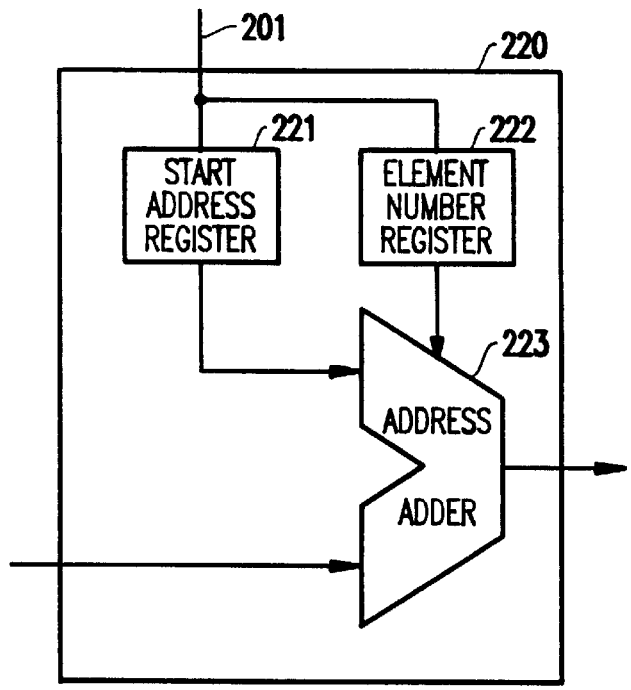
FIG. 5 is a block diagram showing the structure of an address generator 220 in accordance with the first embodiment of the present invention.
Figure 6:
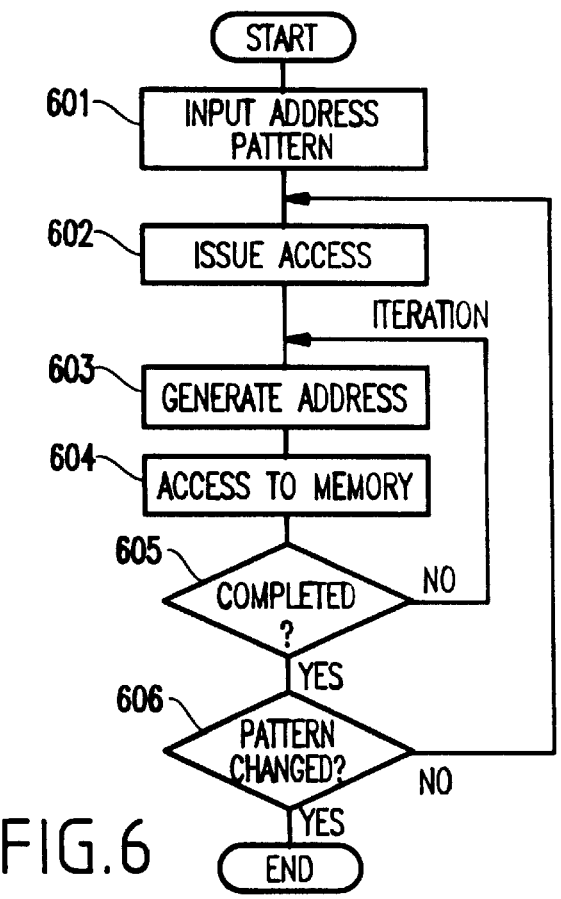
FIG. 6 is a flowchart showing the operation of an access to the memory in accordance with the embodiment of the present invention.

Referring to FIG. 5, the address generator 220 includes a start address register 221 that holds the start address given by the address command line 201, an element number register 222 that holds the number of elements held in the relative address table 210, and an address adder 223 that adds the respective values of the relative address table 210 to the start addresses. The address adder uses conventional circuitry and, for brevity, the construction thereof will not be further described herein. When relative addresses are set in the relative address table 210, the number of elements therein is set to the element number register 222. Before an access to the memory 240, an address of a first element is set to the start address register 221. The address adder 223 adds the respective relative addresses in the relative address table 210 to the start address in the start address register 221 by the number of elements set in the element number register 222 in accordance with a request on the address command line 201. The addresses thus generated are supplied to the memory 240.

Herein below and referring to FIGS. 1–6, the operation of the image processing system in accordance with the above-mentioned embodiment of the present invention will be described.

First, prior to an access to the memory 240, an address pattern is input to the relative address table 210 in accordance with a request from the processing unit 100 (Step 601). For example, accessing with the address pattern shown in FIG. 3 requires setting the relative address table 210 as shown in FIG. 4. Simultaneously, the number of elements is stored in the element number register 222.

After the above-mentioned setting operations in Step 601, the processing unit 100 issues a memory access to the storage device 200 (Step 602). Hence, the type of request, such as a read request or a write request and the start address are transferred to the storage device 200 through the address command line 201. In step 603, the address generator 220 generates an absolute address in accordance with the access request type (e.g., a read or write request) and accesses the memory 240 in Step 604. In Step 605, the address generation and the memory access operations are iterated (e.g., repeatedly performed) in order until they are completed for all elements of the relative address table 210.

After the access has been completed for all elements of the relative address table 210, the process continues to Step 606 at which it is determined whether the pattern has changed. Specially, when another access is to be processed with the same pattern (e.g., no change in pattern), the processing unit 100 may issue another memory access to the storage device 200 without any re-transfer of the address pattern being necessary and the process loops to Step 602.

For example, to access a 3×3 pixel region starting from A5 in FIG. 3, it is sufficient only to issue a memory access with the start address A5. Hence, if an access to the memory is iterated with respect to a fixed pattern as in the image processing, only the start address need be issued every time without any transfer of all addresses.

Figure 7:
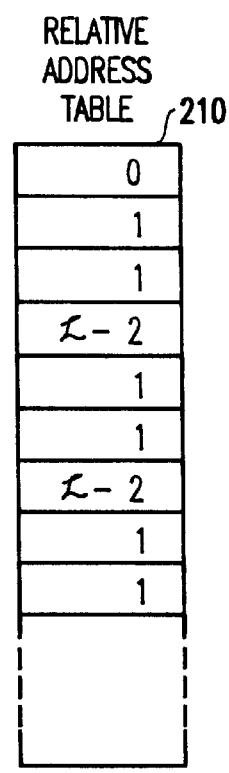
FIG. 7 is a diagram showing the structure of an relative address table 210 in accordance with a second embodiment of the present invention.

Although the relative address table 210 in the above example stores the relative addresses to the start address, the relative address table 210 instead may store the relative addresses to the immediately previous address as shown in FIG. 7 according to a second embodiment of the relative address table 210.

As described above, in the image processing system in accordance with the first embodiment of the present invention, the address generating function is provided by the storage device 200, whereby when a fixed pattern access to the memory 240 is repeated, a transfer of all addresses is not typically required. Thus, a signal path through which the address is transferred in the conventional schemes is unnecessary and bus traffic is reduced. Moreover, data written in the memory 240 or read from the memory 240 is allowed to be temporarily stored in the access buffer 230, as a result of which the processing unit 100 is not required during the entire period of an access to the storage device 200 and thus the processing unit may be available for other processing tasks or requests, and the entire processing performance can be improved.

As is apparent from the above description, according to the present invention, since the bus traffic for the transfer of addresses can be reduced, and the processing unit can be released immediately after the transfer of data to, for example, do other tasks, the performance of the entire system can be improved as compared to the convention systems. Hence, the number of signal lines for address transfer can be reduced.

While the invention has been described in terms of several preferred embodiments, those skilled in the art will recognize that the invention can be practiced with modification within the spirit and scope of the appended claims.

What is claimed is:

1. A storage device, comprising:

a memory;

an address input port for receiving one start address;

a relative address table for storing a plurality of relative addresses of a previous access to said memory, said plurality of relative addresses forming an address pattern for data access to said memory; and an address generator for generating a plurality of absolute addresses when another access is to be processed with said address pattern based on said one start address received by said address input port and relative addresses in said relative address table without any re-transfer of said address pattern to said relative address table.

2. The storage device as claimed in claim 1, wherein said address generator includes an adder for generating absolute addresses based on said start address of said plurality of relative addresses stored in said relative address table.

3. The storage device as claimed in claim 1, wherein said address generator includes a holder for holding a number of the plurality of relative addresses stored in said relative address table.

4. The storage device as claimed in claim 3, wherein said address generator further includes an adder for generating said absolute addresses based on said start address and said number of the relative addresses held in said holder.

5. The storage device as claimed in claim 4, further comprising a second holder for holding said start address.

6. The storage device as claimed in claim 4, further comprising a register for holding said start address.

7. The storage device as claimed in claim 4, further comprising a buffer for holding one of write data to said memory and read data from said memory.

8. The storage device as claimed in claim 7, wherein said buffer comprises a first-in first-out (FIFO) memory.

9. The storage device as claimed in claim 1, wherein said address generator includes an address element number register for holding a number of the plurality of relative addresses stored in said relative address table.

10. A storage device, comprising:

a memory;

a relative address table for storing a plurality of relative addresses of a previous access to said memory, said relative addresses forming an address pattern for data access to said memory and being relative to a start address for said memory; and an address generating unit for receiving said start address and for generating absolute addresses when another access is to be processed with said address pattern based on said start address and relative addresses in said relative address table without any re-transfer of said address pattern to said relative address table.

11. A storage device, comprising:

a memory;

a relative address table for storing a plurality of relative addresses, said relative addresses forming an address pattern for data access to said memory and being an immediately previous access to said memory; and an address generator for receiving a start address and for generating absolute addresses when another access is to be processed with said address pattern based on said start address and relative addresses in said relative address table without any re-transfer of said address pattern to said relative address table.

12. An image processing system, comprising:

a storage device for storing image data, said storage device having a memory and a table coupled to said memory, a plurality of relative addresses of a previous access to said memory being stored in said table, said plurality of relative addresses forming an address pattern for data access to said memory, and absolute addresses being generated when another access is to be processed with said address pattern based on said address pattern and a start address and relative addresses in said relative address table without any re-transfer of said address pattern to said relative address table;

a processing unit for preparing the image data stored in said storage device to be displayed; and a display unit for displaying the image data stored in said storage device.

13. The image processing system as claimed in claim 12, further comprising:

an address generator for receiving a start address of said plurality of relative addresses stored in said table and for generating said absolute addresses with respect to said plurality of relative addresses.

14. The image processing system as claimed in claim 13, wherein said address generator includes a holder for holding a number of the plurality of relative addresses stored in said table, and an adder for generating said absolute addresses based on said start address and said number of the relative addresses held in said holder.

15. The image processing system as claimed in claim 14, further comprising a buffer for holding one of write data to said memory and read data from said memory.

16. A method of accessing a memory in a storage device, said method comprising steps of:

storing relative addresses of a previous access to said memory in a relative address table of said storage device, said relative addresses forming an address pattern for data access to said memory;

receiving, by an address generator of said storage device, a start address; and generating, by said address generator, an absolute address location in said memory when another access is to be processed with said address pattern based on said start address and said address pattern stored in said relative address table without any re-transfer of said address pattern to said relative address table.

17. A method of accessing to a memory in a storage device as claimed in claim 16, further comprising a step of:

accessing said memory.

18. The method of accessing the memory in the storage device as claimed in claim 17, wherein both the step of generating the address and the step of accessing to said memory are iterated by a number of said plurality of relative addresses.

19. The method of accessing the memory in the storage device as claimed in claim 17, wherein both the step of generating the address and the step of accessing said memory are iterated until all addresses of said relative address table have been processed.

20. The method of accessing the memory in the storage device as claimed in claim 19, further including a step of receiving a next start address when a next access is to be conducted with the relative addresses stored in said relative address table.

* * * * *